United States Statutory Invention Registration [19]

[11] Reg. Number: H425

Norris et al. [43] Published: Feb. 2, 1988

[54] O—X—O AND O—X—X SUSPENSION FERTILIZERS FROM PHOSPHORIC ACID, PHOSPHATE ROCK, AND POTASH

[75] Inventors: Herbert W. Norris; Jeffrey L. Boles, both of Tuscumbia, Ala.

[73] Assignee: Tennessee Valley Authority, Muscle Shoals, Ala.

[21] Appl. No.: 911,703

[22] Filed: Sep. 26, 1986

[51] Int. Cl.[4] ..... C05B 1/00

[52] U.S. Cl. ..... 71/41; 71/64.08; 423/167; 423/319

[58] Field of Search ..... 71/34, 37, 41; 423/158, 423/166, 167, 309, 319, 321 C

[56] References Cited

FOREIGN PATENT DOCUMENTS

| | | | |
|---|---|---|---|
| 0208971 | 4/1984 | Fed. Rep. of Germany | 71/41 |
| 0603638 | 4/1978 | U.S.S.R. | 71/41 |
| 0604847 | 4/1978 | U.S.S.R. | 71/41 |

*Primary Examiner*—Edward A. Miller
*Assistant Examiner*—Susan Wolffe
*Attorney, Agent, or Firm*—Robert A. Petrusek

[57] ABSTRACT

Process and Apparatus for preparing O—X—O and O—X—X (i.e., zero nitrogen) suspension fertilizers wherein phosphate rock is acidulated with merchant-grade wet-process orthophosphoric acid. The instant invention requires only a minimal amount of relatively inexpensive equipment. The process comprises a first-charging step wherein a reactor vessel is partially filled with water of formulation, phosphoric acid, and phosphate rock. The resulting mixture is subjected to a digestion step for a predetermined period of time to effect reaction of the acid and phosphate rock added thereto. Said digestion step is subsequently followed by a second-charging step wherein predetermined amounts of potassium chloride and/or suspending agent are added to said reactor vessel. The proportion of phosphate values won from the phosphate rock, the optimum length for the digestion period, and the grades of the final products recovered from the process of the instant invention are all factors which are in a dependent and substantially proportional relationship with the quality of the raw materials utilized therein. The highly concentrated suspension fertilizer products are suitable for use in commercially available fluid fertilizer application equipment by having a rheology such that the suspension fertilizers can be sprayed directly on to croplands, as for example those used to raise legumes, which croplands require fertilizer amendments having little or no nitrogen. In addition, the highly concentrated suspension fertilizer products exhibit very acceptable short-term storage properties.

11 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

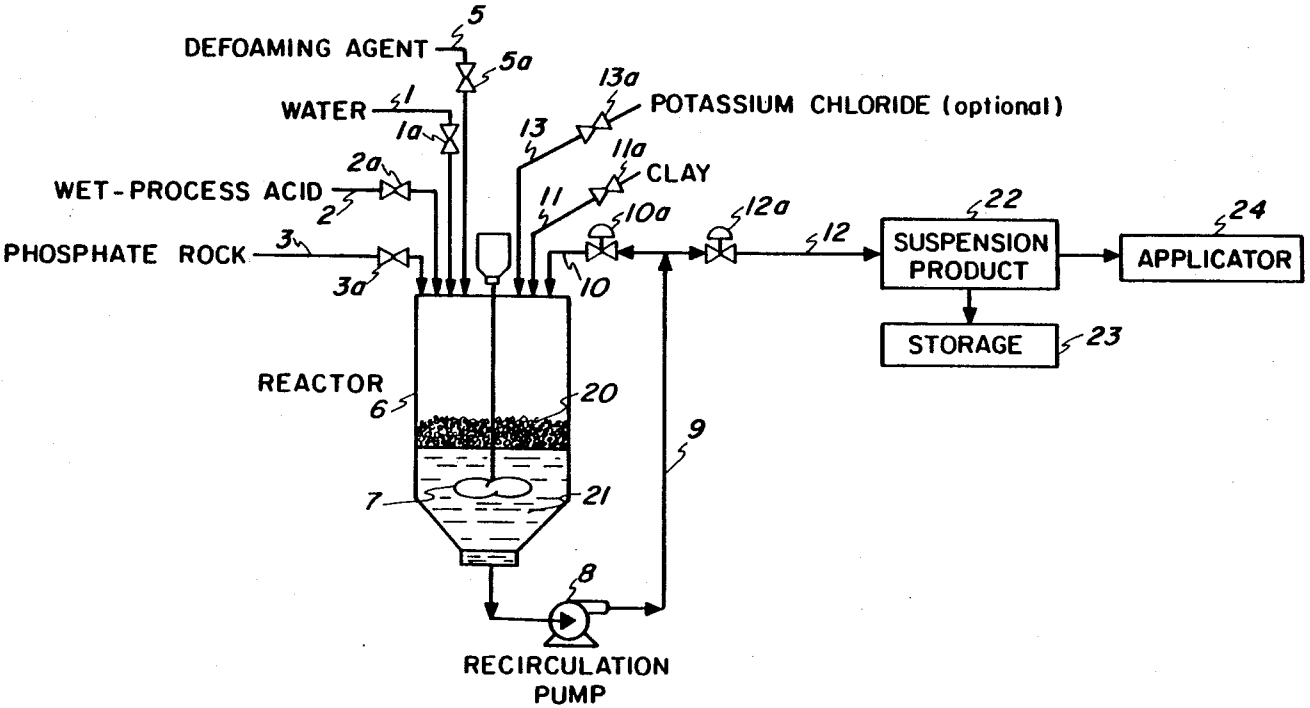
DEFOAMING AGENT
WATER
WET-PROCESS ACID
PHOSPHATE ROCK
POTASSIUM CHLORIDE (optional)
CLAY
REACTOR
RECIRCULATION PUMP
SUSPENSION PRODUCT
STORAGE
APPLICATOR
5
5a
1
1a
2
2a
3
3a
13a
13
11a
11
10a
10
12a
12
9
8
20
21
6
7
22
23
24

O—X—O AND O—X—X SUSPENSION FERTILIZERS FROM PHOSPHORIC ACID, PHOSPHATE ROCK, AND POTASH

The invention herein described may be manufactured and used by or for the Government for governmental purposes without the payment to us of any royalty therefor.

INTRODUCTION

The present invention relates to a new, novel, and relatively simple and inexpensive technique for easily and accurately producing nitrogen-free fertilizers and is particularly applicable to the production of suspension fertilizers by acidulation of relatively low-cost phosphate rock with relatively inexpensive wet-process orthophosphoric acid. More particularly, the present invention relates to a novel method for the production of concentrated high-grade suspension fertilizers from low-cost, impure, raw materials by a simple and economical batch-type process. Still more particularly, the present invention relates to means and methods for the efficient production of high-grade O—X—O and O—X—X (i.e., zero nitrogen) suspension fertilizers containing therein relatively small particles of suspension and displaying eminently improved characteristics of low viscosity, high pourability, and short-term storage properties.

BACKGROUND OF THE INVENTION

1. Field of the Invention

Heretofore, processes of the prior art wherein suspension fertilizers were produced by acidulation of phosphate rock used either nitric acid or sulfuric acid as the primary acidulating reagent with, in some instances, phosphoric acid being used in conjunction therewith as an ancillary acidulating reagent. A principal consideration of the instant invention is associated with the fact that suspension fertilizers, produced by the practice of the teachings of the prior art, which derive substantial proportions of their $P_2O_5$ content from phosphate rock necessarily have been restricted to being products of low phosphate content because of the low $P_2O_5$ and high impurity content of the phosphate rock used as the feed therein. This restriction improsed upon the products produced by such prior art processes was also found to be of necessity in order to avoid occurrence of high viscosity characteristics therein, which high viscosity characteristics tend to destroy the fluidity of such suspensions and render the transfer properties thereof, either by gravity or pumping distribution to the soil, rather impractical or indeed, impossible. It will be appreciated by those skilled in the art that suspension fertilizers with such low analysis have a very distinct economic disadvantage as compared with higher-analysis products because costs of handling, freight, storage, and application are higher per unit of plant nutrient, all of which are factors of increasingly greater importance as costs associated therewith continue to escalate at a rate faster than certain other considerations, as for example, the costs of production of said fertilizers.

2. Description of the Prior Art

At the present time, because of the state of the art developed in view of and in response to said principal consideration supra, there are available a number of methods and means which utilize in one way or another the art of producing fertilizers by acidulation of phosphate rock, some of which are represented by the investigations, teachings, and disclosures set forth in the following patents: U.S. Pat. Nos. 3,507,641, Richmond et al, Apr. 21, 1970, 3,619,162, Pottgiesser et al, Nov. 9, 1971, and British Pat. No. 1,165,257, Palgrave et al, Sept. 24, 1969.

As has been noted above, numerous prior art investigators have discovered, taught, and disclosed a plethora of methods and/or means for acidulation of phosphate rock. In Great Britain in 1969, Palgrave et al ('257 supra) reacted phosphate rock with nitric acid and neutralized the acidulate with ammonium hydroxide. Subsequently, potassium chloride was added to the resulting neutralized acidulate in order to produce a 8.5-8.3-8.5 ($N—P_2O_5—K_2O$) grade fluid fertilizer.

In 1970, Richmond et al ('641 supra) reacted phosphate rock with phosphoric acid and then with sulfuric acid. The resulting acidulate was subsequently neutralized with anhydrous ammonia to produce a 7-21-0 ($N—P_2O_5—K_2O$) grade slurrey fertilizer. In later investigations Pottgiesser et al ('162 supra) produced a 13.5-6-0 ($N—P_2O_5K_2O$) grade slurry by reacting nitric acid with phosphate rock and subsequently feeding the resulting slurry into a body of preneutralized solution maintained at pH 7-10 by addition thereto of aqua ammonia.

There is no suggestion in the teachings of any of the above prior art references of the viable technique of the instant invention for the practice of processes effective in the production of zero-nitrogen phosphate grade or zero-nitrogen phosphate-potassium grade suspension fertilizers by utilizing wet-process phosphoric acid as the exclusive acidulating agent therein.

SUMMARY OF THE INVENTION

The instant invention relates to a vastly improved technique, including methods and means, for the production of certain types of fertilizers and is particularly applicable to the production of suspension fertilizers by acidulation of phosphate rock with merchant-grade wet-process orthophosphoric acid. The instant invention provides a means and method of production of zero-nitrogen phosphate grade or zero-nitrogen phosphate-potassium grade suspension fertilizers eminently suitable for use in commercially available fluid fertilizer application equipment by being further characterized as having a rheology such that said suspension fertilizers can be sprayed directly onto croplands, as for example those used to raise legumes, which croplands are in turn characterized as requiring little or no nitrogen amendments added thereto. The gist underlying effecting the concept of the instant invention involves the use of a digestion step of predetermined length for allowing sufficient time for effecting the reaction between the phosphate rock and the wet-process acid. The effecting of the method of the instant invention requires only a minimal amount of relatively inexpensive equipment and is simply and easily placed into practice by setting into motion a first-charging step wherein a reactor vessel is partially filled with water of formulation, phosphoric acid, and phosphate rock. The resulting mixture is subjected to the all important digestion step supra for a predetermined period of time to effect reaction of the acid and phosphate rock added thereto. In an alternate embodiment of the instant invention said digestion step may be subsequently followed by a second-charging step wherein predetermined amounts of potassium chloride are added to said reactor vessel. In either embodiment of the instant invention a suspending agent is added to the reactor at about this stage, i.e., after the digestion step. The proportion of phosphate values won from the phosphate rock, the optimum length for the digestion period, and the grades of the final products recovered from the process of the instant invention have been determined to be factors which are in a dependent and substantially proportional relationship with the quality of the raw materials utilized therein.

OBJECTS OF THE INVENTION

It is therefore a principal object of the present invention to develop a new method and/or means for easily, quickly, and accurately producing suspension fertilizers of low pH which contain no nitrogen and are tailored for use primarily on crops such as legumes which require little or no nitrogen amendments added thereto.

Another principal object of the present invention is to develope a new method and/or means for easily, quickly, and accurately producing suspension fertilizers of low pH which contain no nitrogen and are tailored for use primarily on crops such as legumes which crops require little or no nitrogen fertilizer amendments, and to further provide such a new and improved process for producing suspension fertilizers from relatively low-cost phosphate rock utilizing therein relatively inexpensive merchant-grade wet-process orthophosphoric acid as the exclusive acidulating reagent.

Still another principal object of the present invention is to develop a new method and/or means for easily, quickly, and accurately producing suspension fertilizers of low pH which contain no nitrogen and are tailored for use primarily on crops such as legumes which crops require little or no added nitrogen, and to further provide such a new and improved process for producing suspension fertilizers from relatively low-cost phosphate rock utilizing therein relatively inexpensive merchant-grade wet-process orthophosphoric acid as the exclusive acidulating reagent to thereby result in the production of products characterized as having both a high plant-available phosphate content and a high water-soluble phosphate content.

A still further object of the present invention is to develop a new method and/or means for easily, quickly, and accurately producing suspension fertilizers of low pH which contain no nitrogen and are tailored for use primarily on crops such as legumes which crops require little or no added in vitro nitrogen, and to further provide such a new and improved process for producing suspension fertilizers from relatively low-cost phosphate rock utilizing therein relatively inexpensive merchant-grade wet-process orthophosphoric acid as the exclusive acidulating reagent to thereby result in the production of products characterized as having both a high plant-available phosphate content and a high water-soluble phosphate content and which resulting fertilizer products are still further characterized as having a rheology such that they can be sprayed directly onto the cropland.

Still a further object of the present invention is to develop a new method and/or means for easily, quickly, and accurately producing suspension fertilizers of low pH which contain no nitrogen and are tailored for use primarily on crops such as legumes which crops require little or no in vitro nitrogen, and to further provide such a new and improved process for producing suspension fertilizers from relatively low-cost phosphate rock utilizing therein relatively inexpensive merchant-grade wet-process orthophosphoric acid as the exclusive acidulating reagent to thereby result in the production of products characterized as having both a high plant-available phosphate content and a high water-soluble phosphate content and which resulting fertilizer products are still further characterized as having a rheology such that they can be sprayed directly onto cropland and wherein said new method and/or means effects the production of said products by a simple batch-type process without sacrifice of quality, grade, or versatileness.

Still further and more general objects and advantages of the present invention will appear from the more detailed description set forth in the following descriptions and examples, it being understood, however, that this more detailed description is given by way of illustration and explanation only and not necessarily by way of limitation, since various changed therein will undoubtedly occur to, and therefore may be made by those skilled in the art without departing from the true scope and spirit of the instant invention.

BRIEF DESCRIPTION OF THE DRAWING

Our invention, together with further objectives and advantages thereof, will be better understood from a consideration of the following description taken in conjunction with the accompanying drawing and examples in which the FIGURE is a flowsheet generally illustrating the principles of our new and novel process.

Referring now more specifically to the single FIGURE, water, for dilution and for providing fluidity to a later mentioned suspension (slurry), along with a requisite proportion of wet-process phosphoric acid are fed from sources not shown through line 1 and means for control of flow 1*a*, and line 2 and means for control of flow 2*a*, respectively, into reactor 6. A predetermined amount of phosphate rock, for formulation, is fed, also from a source not shown, through line 3 and means for control of flow 3*a*, into reactor 6. As shown, reactor 6 is equipped with stirrer means 7, which for the sake of convenience is depicted as a common type propeller or turbine-type agitator mixer mounted on a rotating shaft. After introduction of said water, phosphoric acid, and phosphate rock into reactor 6, the reaction resulting therefrom results in the production of foam, generally depicted as 20, juxtaposed the top surface of slurry, generally depicted as 21, formed therein. Since copious amounts of foam 20 formed in reactor 6 can seriously interfere with the proper conduct of the process of the instant invention, same is effectively reduced, or dispensed with, by addition, from a source not shown, through line 5 and means for control of flow 5*a*, of relatively small amounts of defoaming agent, such as for example sulfonate of oleic acid. Slurry 21 is vigorously agitated by action of stirrer means 7 and simultaneously recirculated, by means of recirculation pump 8, through line 9, line 10, and check valve 10*a* during the ensuing digestion period for a period of time ranging from about 10 to about 45 minutes, depending on the quality of the raw materials introduced into reactor 6, i.e., the phosphoric acid and the phosphate rock. In the embodiment of the instant invention wherein same is conducted for production of O—X—O suspensions, after sufficient time has elapsed to effect said digestion period, clay, from a source not shown, is fed through line 11 and means for control of flow 11*a* into reactor 6. Subsequently, said clay is gelled, for a period of time ranging from about 5 to about 20 minutes and usually about 10 minutes, by means of agitation provided in reactor 6 by stirrer means 7 and recirculation pump 8. The resulting final suspension product(s) 22 is subsequently discharged through line 12 and check valve 12*a* to either storage 23 or in some instances directly to applicator 24, or other types of equipment to be utilized in the application of same to the soil. In the embodiment of the practice of the instant invention wherein same is practiced for the direct production of O—X—X suspensions, potassium chloride, from a source not shown, is fed via line 13 and means for control of flow 13*a*, into reactor 6 prior to the aforementioned clay addition to reactor 6, through line 11 and means for control of flow 11*a*. Of course, it will be appreciated that in still another embodiment of the instant invention, O—X—O suspensions produced according to the first embodiment supra can be stored for short periods of time and subsequently mixed with potassium chloride to produce O—X—X suspensions at a time convenient and prior to application of same to the soil.

DESCRIPTION OF THE PREFERRED EMBODIMENTS

In carrying out the objects of the present invention in one form thereof, we have found that highly concentrated O—X—O and O—X—X suspension fertilizers with both high-grade and excellent physical properties can be produced by carefully controlling the acidulation of phosphate rock with merchant-grade wet-process orthophosphoric acid.

In practicing the operation of the instant invention, the reaction vessel is charged with water of formulation and with wet-process phosphoric acid (about 50 percent to about 58 percent and usually about 54 percent $P_2O_5$). The phosphate rock (finely ground flotation concentrate; 30 percent $P_2O_5$; preferably about 85 percent—100 mesh) is then slowly fed into the reaction vessel. A small amount (0.1 to 0.2 percent) of an aqueous solution of sulfonated oleic acid (10 percent solution) is added to reduce the foam which was produced by the resulting reaction. We have found that by allowing the acid-water-phosphate rock slurry a sufficient digestion period, usually ranging from about 10 to about 45 minutes, there is provided sufficient and adequate time for complete reaction of said acid and phosphate rock. After the digestion period is over, the gelling clay is added and allowed to gel for 10 minutes for production of a phosphate suspension fertilizer. The period of time for purposes of this gelling can range from about 5 minutes to about 20 minutes. In practicing the operation of the instant invention for production of an O—X—X suspension fertilizer, the formulated amount of potassium chloride (62 percent $K_2O$) is added prior to addition of the clay. Quite unexpectedly we have discovered that in the practice of our new and novel invention that the portion of plant-available $P_2O_5$ varies with the proportion of percentage of the total $P_2O_5$ derived from phosphate rock. We have found that when 30 percent of the total $P_2O_5$ was derived from phosphate rock the plant-available $P_2O_5$ from the phosphate rock ranged from 60 to 70 percent; the remainder of the total $P_2O_5$ being supplied by the wet-process orthophosphoric acid which is 100 percent plant available. It should be noted that plant-available $P_2O_5$ is well known to the fertilizer industry as the citrate-soluble portion of the total $P_2O_5$. We have also discovered that decreasing the $P_2O_5$ derived from phosphate rock to 25 percent of the total $P_2O_5$ increased the plant-available $P_2O_5$ from phosphate rock to the range of 70 to 80 percent. We found further that if we decreased the percentage of $P_2O_5$ derived from phosphate rock to 20 percent of the total $P_2O_5$ that 85 to 95 percent of the $P_2O_5$ from phosphate rock became plant available.

The principal advantage realized by practicing the teachings of the instant invention is that high-analysis zero-nitrogen O—X—O and O—X—X suspension fertilizers can be rapidly produced from low-cost raw materials by a simple, economical, batch-type process. The equipment, which consists of a reactor equipped with an agitator, is simple, economical, and readily available in a multitude of already existing plants. Further aspects of the instant invention will become apparent hereinafter, and the specification concludes with claims particularly pointing out and distinctly claiming the subject matter which we regard as our invention. The invention, however, as to method of operation with other objects and advantages thereof, may best be understood by reference to the following description.

The term "suspension fertilizer" as used herein designates a fluid fertilizer generally containing nutrients in solution and in finely divided solid form which are held suspended homogeneously by a gelling-type clay. Other active or inert substances may also be present as by-products or by reason of delibrate addition thereto.

The following abbreviations are used in this application. The use of three numbers separated by hyphens, e.g., 0-19-19, 0-11-33, and so on, refers to the respective percentage contents of nitrogen (as N), phosphorus (as $P_2O_5$), and potassium (as $K_2O$). The designation O—X—O refers to a fertilizer with an undetermined amount of $P_2O_5$ containing zero nitrogen and zero potassium. The designation O—X—X refers to a fertilizer with an undetermined amount of $P_2O_5$ and $K_2O$ which contains zero nitrogen. Such abbreviations are well known to members of the fertilizer industry.

EXAMPLES

In order that those skilled in the art may better understand how the present invention may be practiced for effecting the production of high-grade O—X—O and O—X—X suspension fertilizers having both good flow characteristics and excellent storage properties, the following examples are given by way of illustration only and not necessarily by way of limitation.

EXAMPLE I

In the pursuit of further information for the purpose of more clearly defining the parameters affecting the practice of the instant invention the investigations herein reported were made to determine optinum operations for effecting the production of O—X—O suspension fertilizers which are entirely satisfactory for substantially direct application to the soil or for relatively short-term storage and subsequent use in the production of O—X—X suspensions. The suspension fertilizers contained 30 percent total $P_2O_5$ with 29.1 percent plant-available $P_2O_5$. The suspension fertilizers obtained about 20 percent of their $P_2O_5$ from phosphate rock and about 80 percent of their $P_2O_5$ from wet-process orthophosphoric acid.

The procedure for operation of our batch-type equipment for production of O—X-O suspension fertilizers, shown in Table I infra, consisted of first charging the reactor with the fomulated water and wet-process orthophosphoric acid. This mixture was then agitated while the required phosphate rock was added. The reaction of the acid and phosphate rock produces foam, which was reduced by addition of a small amount of aqueous sulfonate of oleic acid (for example, about 0.05 to about 0.3 weight percent of slurry, and added for convenience as a 10-percent solution). After the foam subsided, the clay (1.5 percent by weight) was added and incorporated into the slurry with the turbine-type agitator and recirculation pump to suspend the solids. The total time required in these tests for the production of a 50-pound batch was about 30 minutes.

Satisfactory suspension fertilizers are required to have viscosities that do not exceed the limits of 800 centipoises at 80° F. and 900 centipoises at 32° F. when measured with a Brookfield viscometer (Model RVT). In addition, it is also required that they are also at least 98 percent pourable in one minute at both 80° F. and 32° F.

TABLE I

Operating Conditions and Physical Properties of O—X—O, 1.5% Clay, Suspension Fertilizers from Wet-Process Acid and Phosphate Rock

| | | |
|---|---|---|
| Batch size, lb (kg) | 2000 | (907) |
| Feed, lb (kg) | | |
| Water | 685 | (311) |
| Phosphoric acid (54% $P_2O_5$) | 885 | (402) |
| Phosphate rock (30% $P_2O_5$) | 400 | (181) |
| Clay (attapulgite) | 30 | (14) |
| Temperature, °F. (°C.) | 135 | (57) |
| Agitator tip speed, ft/s (m/s) | 33 | (10) |
| Product chemical analysis | | |
| Total $P_2O_5$, wt % | 30 | |
| Plant-available $P_2O_5$, wt % | 29.1 | |
| Physical properties | | |
| pH 1.4 | | |
| Initial viscosity at 75° F., cP | 150 | |
| Viscosity after 14 days at 75° F., cP | | |
| at 75° F. | 100 | |
| at 32° F. | 200 | |

EXAMPLE II

For the purpose of the investigations reflected by this example in the pursuit of still further definition of the parameters referred to in Example I supra, this portion of our investigation is based on the use of our new and novel method for the production of high quality O—X—X suspension fertilizers of three different ratios. These suspension fertilizers are suitable for immediate application to the soil or they can be stored for short periods of time, i.e., about 2 weeks, and in some instances as much as about 4 weeks. These products were produced from wet-process acid and phosphite rock as was described in Example I supra. However, in production of these suspensions the required amount of potassium chloride was added prior to the clay addition step. The recommended formulations, and chemical and physical properties of suspension fertilizers of grade 0-19-19, 0—13-26, and 0-11-33 are shown in Table II infra.

TABLE II

Recommended Formulations and Chemical and Physical Properties of O—X—X Suspension Fertilizers from Wet-Process Acid, Phosphate Rock, and Potassium Chloride

| Nominal grade | 0-19-19 | 0-13-26 | 0-11-33 |
|---|---|---|---|
| Batch size, lb (kg) | 2000 (907) | 2000 (907) | 2000 (907) |
| Feed, lb (kg) | | | |
| Phosphoric acid (54% $P_2O_5$) (80% of total $P_2O_5$) | 581 (263) | 397 (180) | 336 (152) |
| Water | 515 (234) | 555 (252) | 418 (190) |

TABLE II-continued

Recommended Formulations and Chemical and Physical Properties of O—X—X Suspension Fertilizers from Wet-Process Acid, Phosphate Rock, and Potassium Chloride

| | | | |
|---|---|---|---|
| Phosphate rock (30% $P_2O_5$) (20% of total $P_2O_5$) | 261 (118) | 179 (81) | 151 (68) |
| Potassium chloride | 613 (278) | 839 (380) | 1065 (483) |
| Clay (attapulgite) | 30 (14) | 30 (14) | 30 (14) |
| Product chemical analysis | | | |
| Total N | 0 | 0 | 0 |
| Total $P_2O_5$ | 19.6 | 13.4 | 11.3 |
| Plant-available $P_2O_5$ | 19.0 | 13.0 | 11.0 |
| Total $K_2O$ | 19.0 | 26.0 | 33.0 |
| Physical properties | | | |
| pH | 1.0 | 1.3 | 0.9 |
| Initial viscosity at 75° F., cP | 450 | 200 | 300 |

INVENTION PARAMETERS

After sifting and winnowing through the data supra, as well as other results and operations of our new, novel, and improved technique, including methods and means for the effecting thereof, the operating variables, including the acceptable and preferred conditions for carrying out our invention are summarized below:

| Variables | Operating Limits | Preferred Limits | Most Preferred Limits |
|---|---|---|---|
| Feed Materials | | | |
| Phosphoric Acid | | | |
| Concentration (percent $P_2O_5$) | 50–58 | 52–56 | 54 |
| Weight percent of slurry | 31–13 | 29–14 | 28–14 |
| Phosphate Rock fraction | | | |
| Weight percent of slurry | 21–7 | 20–7 | 19–7 |
| Flotation concentrate % $P_2O_5$ | 27–32 | 29–31 | 30 |
| Size (Tyler series) expressed as percent through - mesh size | 85–60 | 85–85 | 85–100 |
| Potash | | | |
| Concentration (percent $K_2O$) | 60–62 | 61–62 | 62 |
| Weight percent of slurry | 55–31 | 54–31 | 53–31 |
| Size (Tyler series) expressed as percent through - mesh size | 98–16 | 98–22 | 98–28 |
| Reactor Conditions | | | |
| Temperature °F. | 40–120 | 50–110 | 60–100 |
| Pressure (psia) | −30 +30 | −10 +20 | about 15 |
| Agitator Tip Speed, ft/sec | 10–200 | 10–100 | 20–40 |
| Acid - Rock Residence time (min) (Digestion Step) | 5–60 | 10–45 | 15–30 |
| Defoaming Reagent | | | |
| Weight percent of slurry | 0.05–0.3 | 0.1–0.3 | 0.1–0.2 |
| Residence time from beginning of the digestion step (min) | 5–60 | 10–45 | 15–30 |
| Potash Residence time (min) (after digestion step) | 5–20 | 5–15 | 10 |
| Clay Residence time (min) (after digestion step) | 5–20 | 5–15 | 10 |
| Clay Type a - attapulgite; b - bentonite | a or b | a | a |
| Proportion of Total $P_2O_5$ From Rock (percent of total) | 30 | 25 | 20 |
| Corresponding $P_2O_5$ From Rock | | | |
| Plant-Available $P_2O_5$ from Rock (percent of total) | 60–70 | 70–80 | 85–95 |
| Grades of Suspension Product | | | |
| Whole No. Nutrient Ratio: 0-1-1 | | | |
| Minimum | 0-15-15 | 0-17-17 | — |
| Maximum | 0-19-19 | 0-19-19 | 0-19-19 |
| Whole No. Nutrient Ratio: 0-1-2 | | | |
| Minimum | 0-10-20 | 0-11-22 | — |
| Maximum | 0-13-26 | 0-13-26 | 0-13-26 |

-continued

| Variables | Operating Limits | Preferred Limits | Most Preferred Limits |
|---|---|---|---|
| Whole No. Nutrient Ratio: 0-1-3 | | | |
| Minimum | 0-9-27 | 0-10-30 | — |
| Maximum | 0-11-33 | 0-11-33 | 0-11-33 |
| O—X—O Grades | | | |
| Minimum | 0-25-0 | 0-27-0 | — |
| Maximum | 0-29-0 | 0-29-0 | 0-29-0 |
| Physical Properties of Product | | | |
| Slurry ph | 0.2-1.5 | 0.7-1.2 | 1.0 |
| Initial viscosity at 75° F., cP | 200-800 | 200-600 | 200-400 |
| Viscosity after 14 days, cP | | | |
| @ 80° F. | 100-500 | 100-400 | 100-300 |
| @ 32° F. | 100-500 | 100-400 | 100-300 |

While we have shown and described particular embodiments of our invention, modifications and variations thereof will occur to those skilled in the art. We wish it to be understood therefore that the appended claims are intended to cover such modifications and variations which are within the true spirit and scope of our invention.

What we claim as new and desire to secure by Letters Patent of the United States is:

1. A process for production of O—X—X zero-nitrogen acid-type suspension fertilizers, said suspension fertilizers having high plant food contents, high available $P_2O_5$ contents, excellent flow properties, low viscosities, and excellent short-term storage properties, said process comprising the steps of:

(1) introducing into reactor means predetermined quantities of water and of wet-process orthophosphoric acid;

(2) introducing into said reactor means a predetermined quantity of phosphate rock for reaction with said wet-process orthophosphoric acid;

(3) maintaining said wet-process orthophosphoric acid and said phosphate rock introduced into said reactor means in intimate contact for a time sufficient to convert a substantial portion of the unavailable $P_2O_5$ values in said phosphate rock to the available form of $P_2O_5$ to form therein a resulting slurry;

(4) introducing into said reactor means a predetermined quantity of antifoaming reagent;

(5) introducing into said reactor means in predetermined portions ranging from about 1 percent to about 2 percent by weight and based on the weight of resulting slurry formed therein, gelling clay and subjecting said introduced gelling clay to substantial agitation for a predetermined period of time; and (6) withdrawing from said reactor means the resulting slurray as an O—X—O type suspension fertilizer;

said process being characterized by the fact that said phosphate rock is utilized to supply a portion of the $P_2O_5$ therein with the remaining portion of said $P_2O_5$ being supplied by said wet-process orthophosphoric acid and said process being further characterized by the fact that said wet-process orthophosphoric acid is substantially the exclusive reagent means utilized for acidulating said phosphate rock.

2. A process for production of O—X—X zero-nitrogen acid-type suspension fertilizers, said suspension fertilizers having high plant food contents, high available $P_2O_5$ contents, excellent flow properties, low viscosities, and excellent short-term storage properties, said process comprising the steps of:

(1) introducing into reactor means predetermined quantities of water and of wet-process orthophosphoric acid;

(2) introducing into said reactor means a predetermined quantity of phosphate rock for reaction with said wet-process orthophosphoric acid;

(3) maintaining said wet-process orthophosphoric acid and said phosphate rock introduced into said reactor means in intimate contact for a time sufficient to convert a substantial portion of the unavailable $P_2O_5$ values in said phosphate rock to the available form of $P_2O_5$ and to form therein a resulting slurry;

(4) introducing into said reactor means a predetermined quantity of antifoaming reagent;

(5) introducing into said reactor means in predetermined portions ranging from about 1 percent to about 2 percent by weight and based on the weight of resulting slurry formed therein, gelling clay and subjecting said introduced gelling clay to substantial agitation for a predetermined period of time; and (6) introducing into said reactor means in predetermined portions predetermined quantities of potassium chloride and subjecting said introduced potassium chloride along with said gelling clay to substantial agitation for a predetermined period of time; and (7) withdrawing from said reactor means the resulting slurry as an O—X—X type suspension fertilizer;

said process being characterized by the fact that said phosphate rock is utilized to supply a portion of the $P_2O_5$ therein with the remaining portion of said $P_2O_5$ being supplied by said wet-process orthophosphoric acid and said wet-process orthophosphoric acid being substantially the exclusive reagent means utilized for acidulating said phosphate rock.

3. The process of claim 1 wherein said resulting O—X—X type suspension fertilizer is subjected to storage for a relatively short period of time ranging in time from about 1 to about 30 days and subsequently is admixed with predetermined portions of potassium chloride to thereby effect the formation of an O—X—X type suspension fertilizer.

4. The process of claim 1 for preparing an O—X—X suspension fertilizers wherein the quantity of $P_2O_5$ obtained from low-cost phosphate rock ranges from 10 to 30 percent of the total $P_2O_5$ with the remaining $P_2O_5$ being obtained from said wet-process orthophosphoric acid.

5. The process of claim 1 for preparing an O—X—O suspension fertilizers wherein the quantity of $P_2O_5$ obtained from low-cost phosphate rock ranges from 20 to 25 percent of the total $P_2O_5$ with the remaining $P_2O_5$ being obtained from said wet-process orthophosphoric acid.

6. The process of claim 2 for preparing an O—X—X suspension fertilizer wherein the quantity of $P_2O_5$ obtained from low-cost phosphate rock ranges from 10 to 30 percent of the total $P_2O_5$ with the remaining $P_2O_5$ being obtained from said wet-process orthophosphoric acid.

7. The process of claim 2 for preparing an O—X—X suspension fertilizer wherein the quantity of $P_2O_5$ obtained from low-cost phosphate rock ranges from 20 to 25 percent of the total $P_2O_5$ with the remaining $P_2O_5$ being obtained from said wet-process orthophosphoric acid.

8. The process of claim 3 for preparing an O—X—X suspension fertilizer wherein the quantity of $P_2O_5$ obtained from low-cost phosphate rock ranges from 10 to 30 percent of the total $P_2O_5$ with the remaining $P_2O_5$ being obtained from said wet-process orthophosphoric acid.

9. The process of claim 3 for preparing an O—X—X suspension fertilizer wherein the quantity of $P_2O_5$ obtained from low-cost phosphate rock ranges from 20 to 25 percent of the total $P_2O_5$ with the remaining $P_2O_5$ being obtained from said wet-process orthophosphoric acid.

10. The process of claim 2 wherein said suspension fertilizer ranges in grade upwards to about 0-19-19, to about 0-13-26, and to about 0-11-33 for the whole number nutrient ratios of 0-1-1, 0-1-2, and 0-1-3, respectively.

11. The process of claim 3 wherein said suspension fertilizer ranges in grade upwards to about 0-19-19, to about 0-13-26, and to about 0-11-33 for the whole number nutrient ratios of 0-1-1, 0-1-2, and 0-1-3, respectively.

* * * * *